United States Patent
Shirokoshi

(10) Patent No.: US 9,222,519 B2
(45) Date of Patent: Dec. 29, 2015

(54) RIGID COUPLING

(75) Inventor: Norio Shirokoshi, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 0 days.

(21) Appl. No.: 14/412,859

(22) PCT Filed: Aug. 17, 2012

(86) PCT No.: PCT/JP2012/005192
§ 371 (c)(1),
(2), (4) Date: Jan. 5, 2015

(87) PCT Pub. No.: WO2014/027383
PCT Pub. Date: Feb. 20, 2014

(65) Prior Publication Data
US 2015/0132047 A1    May 14, 2015

(51) Int. Cl.
*F16D 1/00*    (2006.01)
*F16D 1/08*    (2006.01)

(52) U.S. Cl.
CPC .......... *F16D 1/0864* (2013.01); *Y10T 29/49959* (2015.01); *Y10T 403/535* (2015.01)

(58) Field of Classification Search
None
See application file for complete search history.

(56) References Cited

U.S. PATENT DOCUMENTS

| | | | |
|---|---|---|---|
| 3,109,663 A * | 11/1963 | Phillips, Jr. | 403/344 |
| 3,127,202 A * | 3/1964 | Koen | 403/19 |
| 3,236,572 A * | 2/1966 | White, Sr. | 403/344 |
| 3,281,170 A * | 10/1966 | Kaplan | 403/373 |
| 3,473,202 A * | 10/1969 | Howard | 403/344 |
| 5,006,007 A * | 4/1991 | Fischer et al. | 403/290 |
| D342,891 S * | 1/1994 | Marui | D8/396 |
| 5,851,084 A | 12/1998 | Nishikawa | |
| 6,290,625 B1 | 9/2001 | Shirokoshi | |
| 6,413,006 B1 * | 7/2002 | Neugart | 403/344 |
| 7,059,996 B2 | 6/2006 | Shirokoshi | |

(Continued)

FOREIGN PATENT DOCUMENTS

| DE | 103 15 685 A1 | 1/2004 |
|---|---|---|
| JP | 09-303412 A | 11/1997 |

(Continued)

OTHER PUBLICATIONS

International Search Report (PCT/ISA/210) mailed on Nov. 20, 2012, by the Japan Patent Office as the International Searching Authority for International Application No. PCT/JP2012/005192.

*Primary Examiner* — Victor MacArthur
(74) *Attorney, Agent, or Firm* — Buchanan Ingersoll & Rooney PC

(57) ABSTRACT

A slotted rigid coupling is configured in such a manner that an inner peripheral surface portion of a shaft hole, the inner peripheral surface portion being located within the slit-equipped fastening section of the coupling body, has an inner diameter d. The inner diameter d of an inner peripheral surface portion of the shaft hole, the inner peripheral surface portion being adjacent to the inner peripheral surface portion, is slightly larger than the inner diameter d. The inner peripheral surface portion is a relief surface recessed outward in the radial direction relative to the inner peripheral surface portion. A shaft is inserted in the shaft hole, and the fastening section is fastened. The region where the inner peripheral surface portion adjacent to the inner peripheral surface portion is provided does not come into contact with the shaft. The shaft can be fastened and affixed to the shaft hole without tilt.

4 Claims, 6 Drawing Sheets

(56) References Cited

U.S. PATENT DOCUMENTS

| | | | |
|---|---|---|---|
| 7,303,480 B2 * | 12/2007 | Endou | 464/78 |
| 7,438,496 B2 * | 10/2008 | Moore | 403/341 |
| 2015/0132047 A1 * | 5/2015 | Shirokoshi | 403/290 |

FOREIGN PATENT DOCUMENTS

| JP | 2000-179629 A | 6/2000 |
|---|---|---|
| JP | 2005-009614 A | 1/2005 |
| JP | 2008-095937 A | 4/2008 |

* cited by examiner

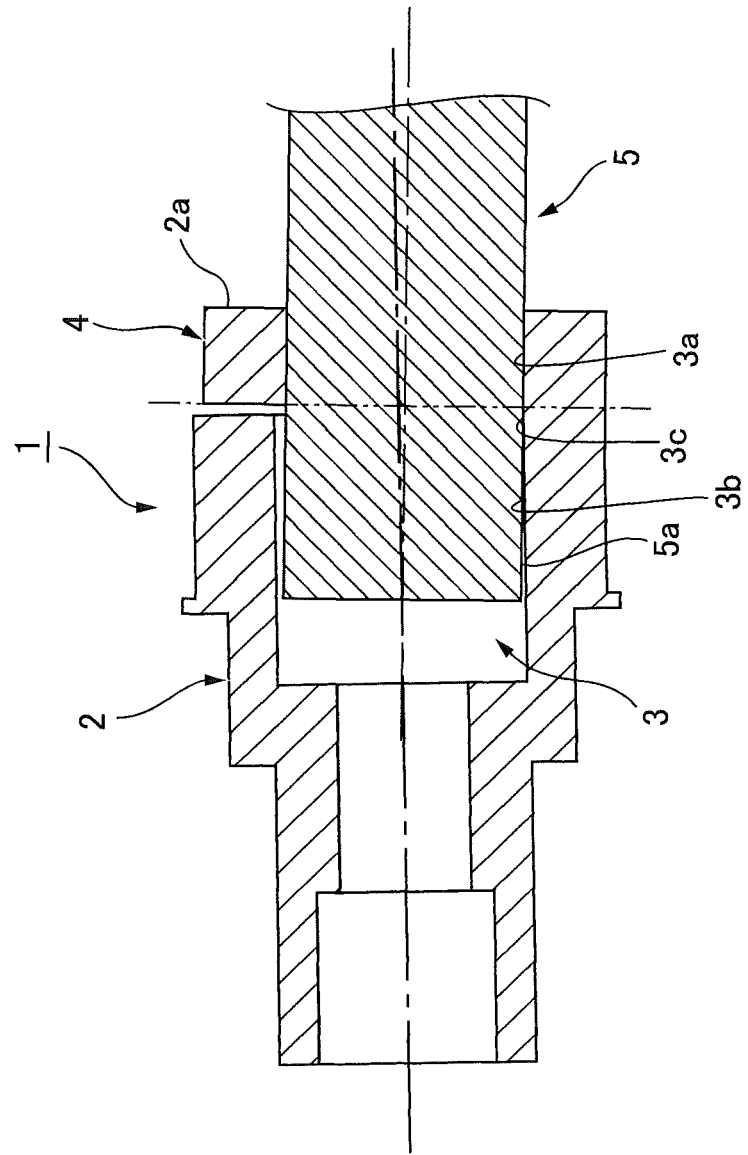

US 9,222,519 B2

RIGID COUPLING

TECHNICAL FIELD

The present invention relates to a slotted rigid coupling used for coaxially coupling two shafts. More specifically, the present invention relates to a slotted rigid coupling capable of non-obliquely and securely fastening a shaft to a slotted coupling portion by using a fastening bolt.

BACKGROUND ART

In a slotted rigid coupling, one shaft to be coupled is inserted into a coupling portion provided with a slot, in which state the coupling portion is fastened by a fastening bolt, so that the shaft will be securely fastened coaxially with the coupling portion. A typical slotted rigid coupling comprises, e.g., a cylindrical coupling body, a round shaft hole of fixed inside diameter extending through the center of the coupling body, and a fastening bolt, as shown in FIG. 4 of patent document 1. A first slit is formed at a position partway along the coupling body, the first slit extending along the circumferential direction of the coupling body. A second slit is formed extending in the direction of the center axis of the coupling, the second slit extending from one end of the coupling body to the first slit. Once the shaft to be coupled has been inserted into the round shaft hole, the portion of the coupling body that is segmented by the second slit is fastened using the fastening bolt, whereby the shaft is securely fastened coaxially with the coupling body.

Such a rigid coupling is used in cases when, e.g. a motor output shaft is to be coaxially coupled with an input shaft for a reducer or the like. In patent documents 2 and 3, a shaft portion of a sun gear for a planetary gear drive is press-fitted and fastened from one of the open ends of a coupling, a motor output shaft is inserted from the other open end of the coupling, the other open end being provided with a slit, and the motor output shaft is securely fastened by a fastening bolt (not shown).

PRIOR ART DOCUMENTS

Patent Documents

[Patent Document 1] JP-A 2008-95937
[Patent Document 2] JP-A 2005-9614
[Patent Document 3] JP-A 2000-179629

SUMMARY OF THE INVENTION

Problems to be Solved by the Invention

In a slotted rigid coupling, when a slotted coupling portion is inserted into a shaft hole in the coupling portion and is securely fastened by a fastening bolt, the shaft may end up being disposed obliquely relative to the axis of the coupling portion. In the past, it was thought that a tolerable amount of axial offset of the shaft outside diameter with relation to the shaft hole inside diameter resulted from the fastening of the fastening bolt. An analysis carried out by the inventors confirmed that the degree of obliqueness (tilt) of the shaft was much higher than such axial offset. In a transmission mechanism or other such mechanism in which it is necessary to transmit rotation highly precisely, it is necessary to reliably prevent or minimize such misalignment.

A problem to be addressed by the present invention is to propose a rigid coupling with which a shaft can be fastened in a non-oblique (non-tilting), or substantially non-oblique (substantially non-tilting) manner.

Means to Solve the Problems

In order to address the aforementioned problem, the rigid coupling of the present invention has:
a cylindrical coupling body;
a shaft hole of circular cross-section, the shaft hole being formed in the coupling body;
a first slit segmenting a part of the coupling body in the direction of the center axis of the coupling;
a second slit segmenting a part of the coupling body in the direction of a coupling circumference; and
a fastening implement for fastening a portion of the coupling body segmented by the first slit and the second slit;
the first slit extending along the circumferential direction of the coupling body throughout a prescribed angle range;
the second slit extending from one end of the coupling body to the first slit in the direction of the center axis of the coupling;
the portion of the coupling body in which the second slit is formed being a fastening section provided with an inner peripheral surface portion, the inside diameter thereof being capable of decreasing when the fastening implement is fastened; and
a relief surface recessed radially outward relative to the inner peripheral surface portion of the fastening section being formed, in the inner peripheral surface of the shaft hole, in at least an inner peripheral surface portion connected to the inner peripheral surface portion of the fastening section.

Typically, shaft holes of identical inside diameter are formed in the coupling body, shaft hole inner peripheral surface portions other than the inner peripheral surface portion of the fastening section are machined, and the entirety of these shaft hole inner peripheral surface portions are used as the relief surface. For example, the shaft hole may be formed in the coupling body so that, relative to the inside diameter of the shaft hole portion in the fastening section, the inside diameter of the other section is approximately 1 mm greater.

FIG. 1A shows the tilting of a shaft occurring in a slotted rigid coupling. A shaft 5 to be coupled is inserted in a shaft hole 3 of a coupling body 2 in a rigid coupling 1. The shaft 5 is inserted from an end surface 2a of a slitted fastening section 4 in the coupling body 2. The shaft 5, once inserted, is fastened to the fastening section 4 by a fastening bolt (not shown).

When the fastening bolt is fastened, the coupling body 2 will assume oblique alignment relative to a portion of the fastening section 4. A shaft hole inner peripheral surface portion 3b comes into contact with the outer peripheral surface 5a of a distal-end portion of the shaft 5 inserted in a portion of the shaft hole 3 located further inward than the fastening section 4. A force pressing the shaft 5 in a direction orthogonal to the axial direction of the shaft 5 is generated by the shaft hole inner peripheral surface portion 3b. This suggests that a relatively high degree of obliqueness existed between the shaft 5 and the coupling body 2. The analysis of the inventors confirmed that high contact pressure is generated between the shaft 5 and an inner peripheral surface portion 3c (the area enclosed by thick lines in the drawing) on the inward side of the shaft hole portion, the inner peripheral surface portion 3c being adjacent to an inner peripheral surface portion 3a of the shaft hole portion for fastening the fastening section 4, as shown in FIG. 1B.

In the rigid coupling of the present invention, when the coupling body is fastened by the fastening implement, a relief surface recessed radially outward is formed in an inner peripheral surface portion (the inner peripheral surface portion 3c in FIG. 1B) subjected to contact pressure from the shaft hole inner peripheral surface side against the shaft inserted into the shaft hole. The relief surface allows contact pressure between the shaft hole inner peripheral surface portion and the shaft to be prevented. Alternatively, such contact pressure can be greatly reduced. As a result, the obliqueness (tilt) of the shaft securely fastened to the coupling body can be prevented or minimized, and the shaft can be precisely and securely fastened coaxially with the coupling body.

BRIEF DESCRIPTION OF THE DRAWINGS

FIG. 1A shows the oblique state of a shaft in a rigid coupling;

MODE FOR CARRYING OUT THE INVENTION

An embodiment of a rigid coupling to which the present invention is applied is described below with reference to the annexed drawings.

Figure 2:
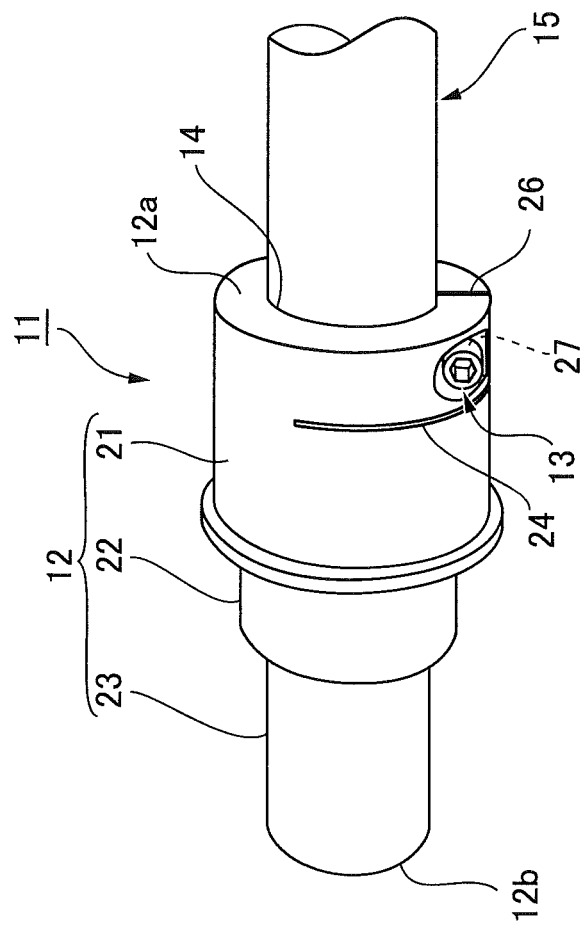
FIG. 2 is a perspective view showing the state of a shaft securely fastened to a rigid coupling to which the present invention is applied.
Figure 3A:
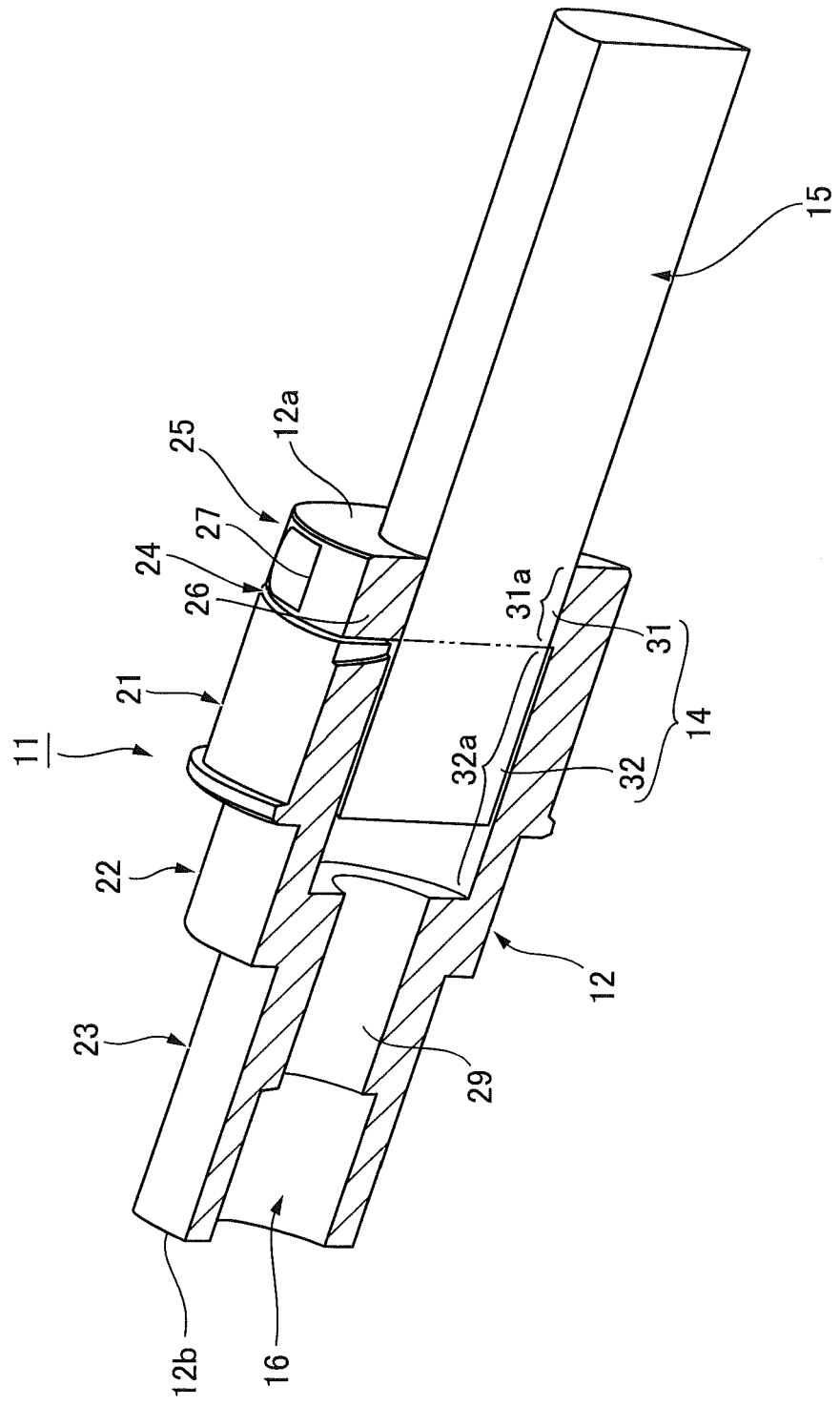
FIG. 3A is a perspective view showing the rigid coupling in FIG. 2 in a cut-off state along a plane including the axis of the rigid coupling.
Figure 3B:
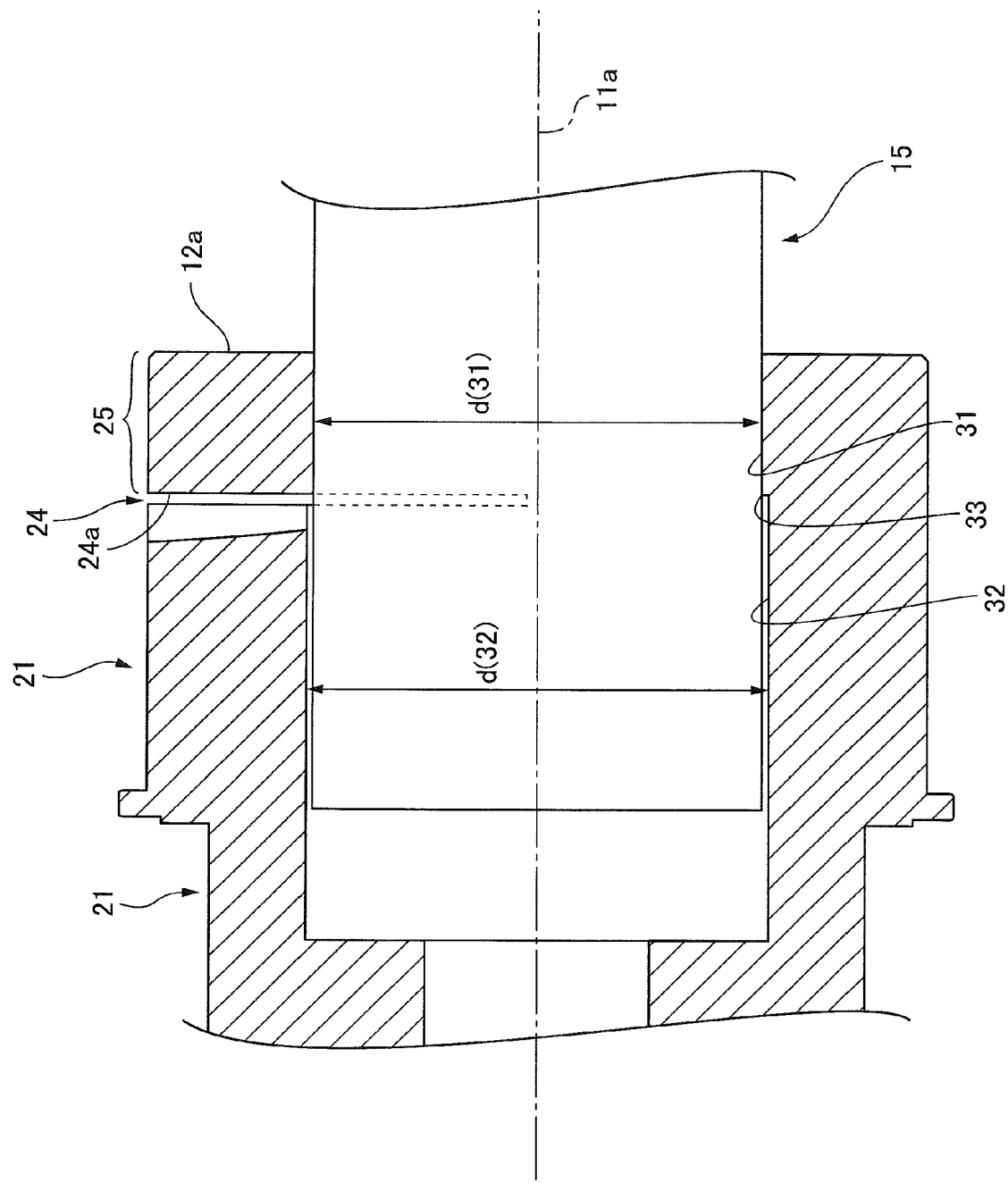
FIG. 3B is an enlarged partial cross-sectional view showing the shaft hole inner peripheral surface in the rigid coupling in FIG. 2.

FIG. 2 is a perspective view showing a rigid coupling according to an embodiment of the present invention. FIG. 3A is a perspective view of the rigid coupling in FIG. 2 in a cut-off state along a plane including the central axis of the rigid coupling, and FIG. 3B is an enlarged partial cross-sectional view showing the shaft hole inner peripheral surface in the rigid coupling. The following description is made with reference to the drawings. A rigid coupling 11 comprises a cylindrical coupling body 12 and a fastening bolt 13. One shaft 15 to be coupled is inserted into a shaft hole 14 opened in one end surface 12a of the coupling body 12, and the shaft 15 is securely fastened to the coupling body 12 in a coaxial state by the fastening bolt 13. Another shaft to be coupled (not shown) is, e.g., securely press-fitted into a shaft hole 16 opened in the other end surface 12b of the coupling body 12. In the resulting state, the two shafts are coaxially coupled via the rigid coupling 11.

A cylindrical section 21 of large diameter, a cylindrical section 22 of smaller diameter, and a cylindrical section 23 of even smaller diameter are coaxially formed in the coupling body 12 from the one end surface 12a toward the other end surface 12b. A first slit 24 of fixed width is formed in the cylindrical section 21 of large diameter, the first slit 24 extending along the circumferential direction throughout an angle range of substantially 180° at a position set apart by a prescribed distance from the end surface 12a in the direction of a center axis 11a. The portion of the cylindrical section 21 in which the first slit 24 is formed is segmented in the direction of the center axis 11a by the first slit 24. The cylindrical portion from the end surface 12a to the first slit 24 functions as a fastening section 25 for securely fastening the shaft 15 using the fastening bolt 13. A second slit 26 is formed in the fastening section 25, the second slit 26 extending linearly from the end surface 12a to the first slit 24 in the direction of the center axis 11a. The fastening section 25 is segmented in the circumferential direction by the second slit 26.

In the fastening section 25, a bolt through-hole 27 is formed in one portion facing the second slit 26, and a bolt-fastening hole (not shown) having an internal thread portion formed in the inner peripheral surface thereof is formed in another portion. The fastening bolt 13 is threaded into the bolt-fastening hole through the bolt through-hole 27, whereby the fastening portion 25 is fastened radially inward and the shaft 15 inserted into the shaft hole 14 is securely fastened to the coupling body 12.

The shaft hole 14 opened in the end surface 12a of the coupling body 12 passes through the cylindrical section 21 and extends to a position partway along the cylindrical section 22, as shown in FIGS. 3A and 3B. The shaft hole 16 opened in the other end surface 12b is a round shaft hole of smaller diameter than the shaft hole 14, the shaft hole 16 extending from the end surface 12b to a position partway along the cylindrical section 23 in the direction of the center axis 11a. The shaft hole 14 and the shaft hole 16 are formed coaxially, and are connected via a round communicating through-hole 29 of smaller diameter than the shaft holes 14, 16.

The shaft hole 14 on the end surface 12a side comprises a shaft hole portion 31 for fastening, the shaft hole portion 31 being formed inside the fastening section 25, and a shaft hole portion 32 complementary to the shaft hole portion 31. The shaft hole portion 31 for fastening is a portion from the end surface 12a to a slit end surface 24a on the end surface 12a side of the first slit 24. The inside diameter d(32) of a round inner peripheral surface portion 32a of the complementary shaft hole portion 32 is marginally larger than the inside diameter d(31) of a round inner peripheral surface portion 31a of the shaft hole portion 31 for fastening. Specifically, the round inner peripheral surface portion 32a is a relief surface marginally recessed radially outward relative to the round inner peripheral surface portion 31a. Therefore, a marginal arcuate step 33 is provided between the round inner peripheral surface portion 31a of the shaft hole portion 31 for fastening and the round inner peripheral surface portion 32a of the complementary shaft hole portion 32 connected thereto.

Figure 4:
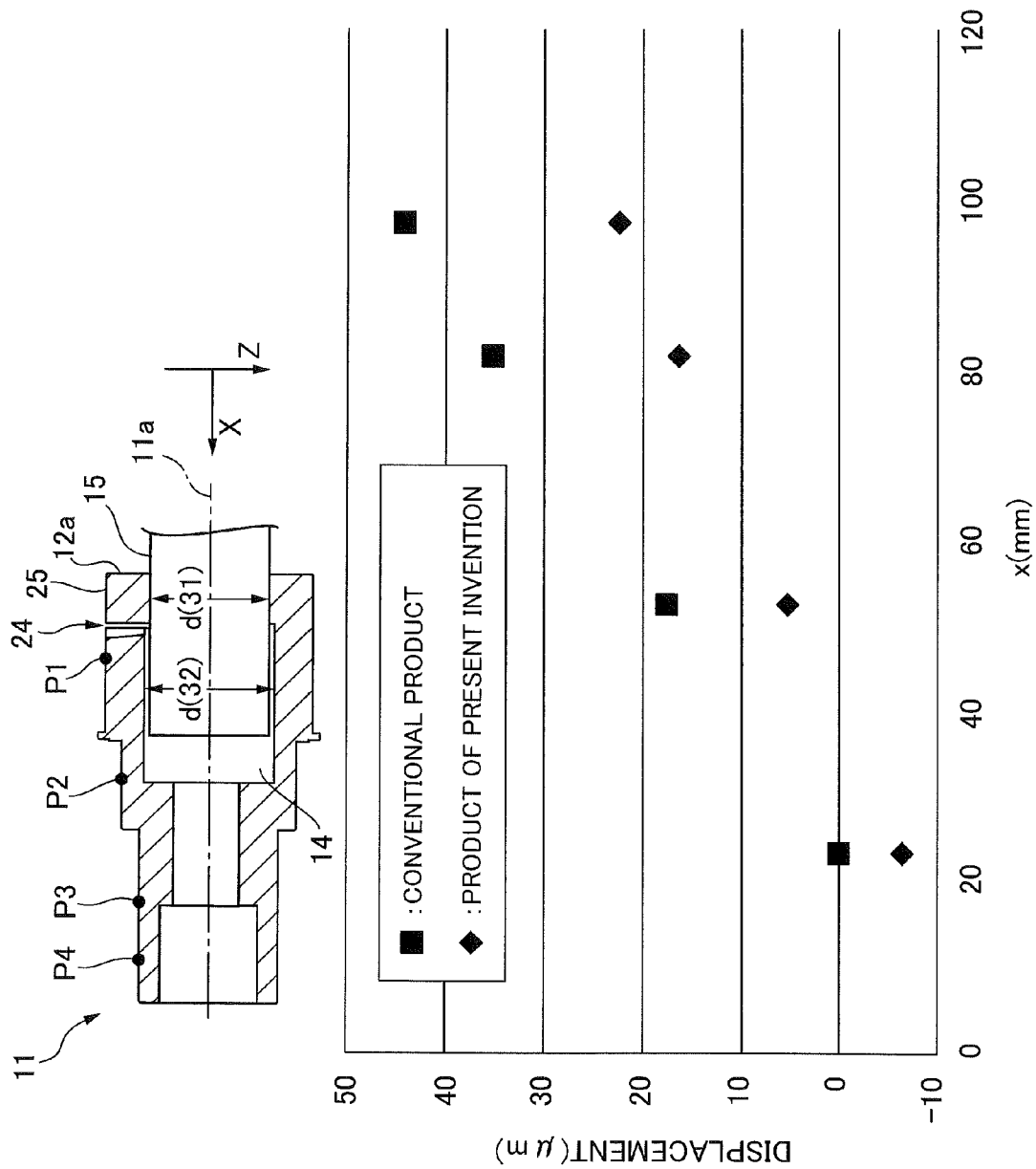
FIG. 4 is a graph showing an example of results of analysis of the obliqueness of the shaft in the rigid coupling in FIG. 2.

FIG. 4 is a graph showing an example of results of analysis of the amount of tilt of the shaft 15 in the rigid coupling 11 configured as described above. The rigid coupling 11 was analyzed in a case in which the coupling inside diameter; i.e., the inside diameter d(31) of the fastening section 25 in the shaft hole 14, was 35.016 mm, the inside diameter d(32) of the complementary shaft hole portion was 36.016 mm, the outside diameter of the shaft 15 was 35.005 mm, and the length of the shaft penetrating the shaft hole 14 was 42 mm. The material used for the rigid coupling 11 and the shaft 15 has a Young's modulus of 206 GPa and a Poisson's ratio of 0.3.

The amount of displacement of the outer peripheral surface of the coupling body 12 in the direction (Z-axis direction in the drawing) orthogonal to the center axis 11a was analyzed at four points P1-P4, which were 24 mm, 54 mm, 84 mm, and 100 mm along the direction (X-axis direction in the drawing) of the center axis 11a from the end surface 12a. The square dots on the graph indicate a case in which the inside diameter of the shaft hole 14 is uniform along the direction of the center axis 11a (35.016 mm), and the rhombic dots indicate the case of the rigid coupling 11 of the present example. As is apparent from the graph, if the rigid coupling 11 of the present example is used, the obliqueness (tilt) of the shaft 15 can be greatly minimized.

The amount by which the inner peripheral surface portion of the shaft hole portion 32 is recessed radially outward relative to the inner peripheral surface portion of the shaft hole portion 31 for fastening, the width of the fastening section 25 (the length of the fastening section 25 from the end surface 12a to the first slit 24), and the position along the center axis 11a at which the fastening bolt 13 is fastened to the fastening section 25 may be adjusted in order to minimize the obliqueness of the shaft 15 to a value within an allowable range. By appropriately setting these values, the obliqueness of the shaft 15 can reliably be minimized to a value within an allowable range.

Figure 1B:
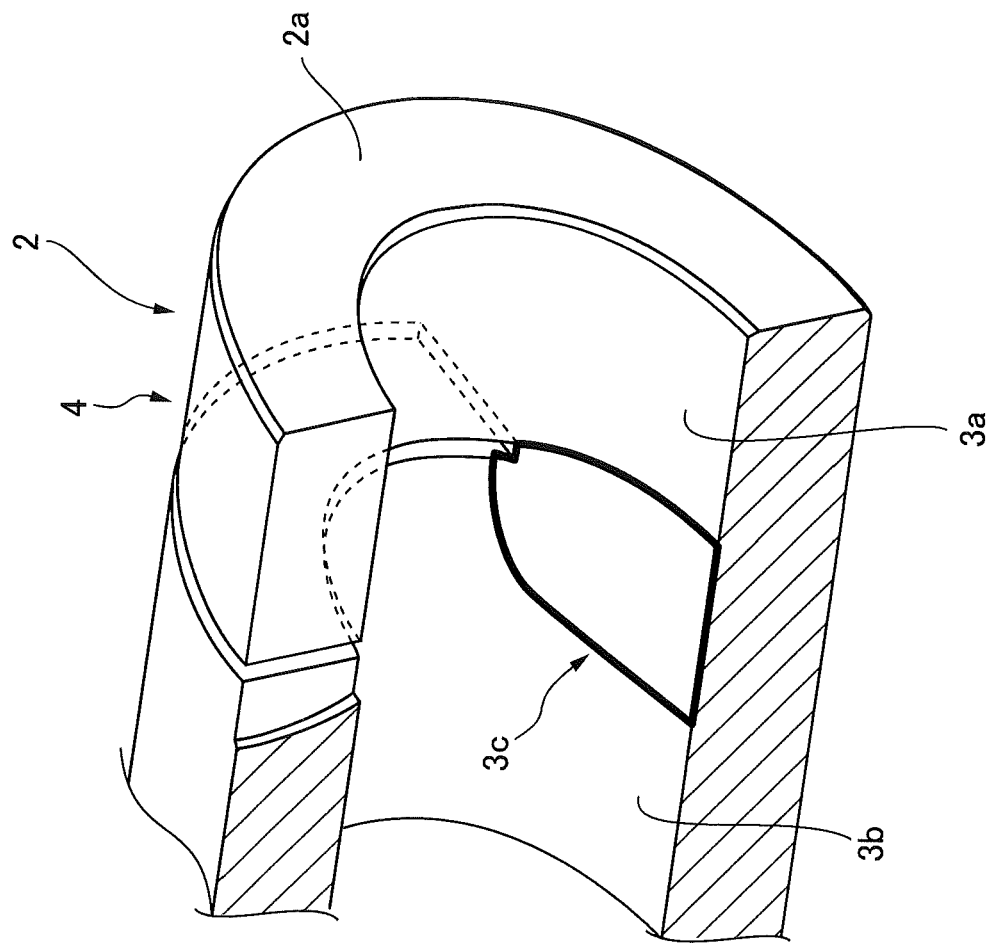
FIG. 1B shows the shaft hole inner peripheral surface portions of the rigid coupling in FIG. 1A.

In the example described above, the inside diameter d(32) of the complementary shaft hole portion is larger overall than the inside diameter d(31) of the shaft hole portion of the fastening section 25. In essence, the adjacent inner peripheral surface portion 3c enclosed by thick lines in FIG. 1B may constitute the relief surface. Specifically, a connecting portion continuous with the inner peripheral surface portion of the fastening section 25, the connecting portion being positioned in the first slit 24, may be cut to a prescribed length in the direction of the center axis 11a to constitute the relief surface. Typically, concerns relating to machining the shaft hole suggest that the relief surface is preferably formed to the entirety of the shaft hole inner peripheral surface portion other than the fastening section 25.

The invention claimed is:

1. A rigid coupling for coaxially coupling first and second shafts comprising:
   a cylindrical coupling body possessing opposing end surfaces;
   a first shaft hole of circular cross-section, the first shaft hole being formed in the coupling body, opened in one of the end surfaces of the coupling body, and having an inner diameter larger than an outer diameter of the first shaft to be coupled, the first shaft hole having an inner peripheral surface;
   a second shaft hole into which the second shaft to be coupled is inserted, the second shaft hole being formed in the coupling body, and opened in a second of the end surfaces of the coupling body;
   a first slit segmenting a part of the coupling body in a direction of a coupling center axis;
   a second slit segmenting a part of the coupling body in a direction of a coupling circumference; and
   a fastening implement for fastening a portion of the coupling body segmented by the first slit and the second slit;
   the first slit extending along a circumferential direction of the coupling body throughout a prescribed angle range;
   the second slit extending from one end of the coupling body to the first slit in the direction of the coupling center axis;
   a portion of the coupling body, in which the first shaft hole is formed, being constituted by a first portion where the second slit is formed and a second portion where the second slit is not formed, wherein the first slit is positioned between the first portion and the second portion;
   the first portion of the coupling body, in which the second slit is formed, being a fastening section provided with an inner peripheral surface portion, an inside diameter thereof being capable of decreasing when the fastening implement is fastened; and
   a relief surface, recessed radially outward relative to the inner peripheral surface portion of the fastening section, the relief surface being formed in the inner peripheral surface of the first shaft hole, in at least a portion of inner peripheral surface of the first shaft hole connected to the inner peripheral surface portion of the fastening section.

2. The rigid coupling of claim 1, wherein an entirety of an inner peripheral surface portion in the inner peripheral surface of the first shaft hole, complementing the inner peripheral surface portion in the fastening section, forms the relief surface recessed radially outward relative to the inner peripheral surface portion in the fastening section.

3. A method of non-obliquely coupling a shaft with the rigid coupling of claim 2, the method comprising:
   setting at least one of a position in the direction of the coupling center axis at which the first slit is formed in the coupling body, a position in the direction of the coupling center axis in which the coupling body is fastened by the fastening implement, and a difference in inside diameter between the relief surface and the inner peripheral surface portion of the fastening section of the shaft securely fastened in the first shaft hole, such that an obliqueness of the shaft relative to the rigid coupling is less than or equal to a prescribed value; and
   coupling the shaft with the rigid coupling.

4. A method of non-obliquely coupling a shaft with the rigid coupling of claim 1, the method comprising:
   setting at least one of a position in the direction of the coupling center axis at which the first slit is formed in the coupling body, a position in the direction of the coupling center axis in which the coupling body is fastened by the fastening implement, and a difference in inside diameter between the relief surface and the inner peripheral surface portion of the fastening section of the shaft securely fastened in the first shaft hole, such that an obliqueness of the shaft relative to the rigid coupling is less than or equal to a prescribed value; and
   coupling the shaft with the rigid coupling.

* * * * *